United States Patent [19]

Cameron et al.

[11] Patent Number: 5,111,713
[45] Date of Patent: May 12, 1992

[54] DYNAMICALLY BALANCED ROTARY UNIT

[75] Inventors: T. Jay Cameron, Pleasanton; Elwyn G. Erickson, San Jose; Cornelius H. Hemphill, Arnold, all of Calif.

[73] Assignee: International Business Machines Corporation, Armonk, N.Y.

[21] Appl. No.: 452,031

[22] Filed: Dec. 18, 1989

[51] Int. Cl.$^5$ .............................................. F16F 15/22
[52] U.S. Cl. ...................................... 74/573 R; 74/572
[58] Field of Search ................................. 74/572-574

[56] References Cited

U.S. PATENT DOCUMENTS

| | | | |
|---|---|---|---|
| 540,925 | 6/1895 | Roy | 74/573 R |
| 817,462 | 4/1906 | Backus | 74/573 R |
| 861,463 | 7/1907 | Hyde | 74/573 R |
| 1,314,005 | 8/1919 | Louden | 74/573 R |
| 2,557,659 | 6/1951 | Ingraham | 73/66 |
| 2,659,243 | 11/1953 | Darrieus | 74/573 |
| 2,963,921 | 12/1960 | Brough et al. | 74/573 R |
| 2,968,970 | 1/1961 | Lepper | 74/573 R |
| 3,109,321 | 11/1963 | Rogers | 74/573 R |
| 4,060,009 | 11/1977 | Wyman | 74/573 |
| 4,075,909 | 2/1978 | Deakin | 74/573 |

FOREIGN PATENT DOCUMENTS

| | | | |
|---|---|---|---|
| 2711561 | 9/1978 | Fed. Rep. of Germany | 74/573 R |
| 2845637 | 4/1979 | Fed. Rep. of Germany | 74/573 R |
| 3802923 | 8/1988 | Fed. Rep. of Germany | 74/573 R |
| 1202949 | 1/1960 | France | 74/573 R |
| 693136 | 4/1978 | U.S.S.R. | |
| 1206637 | 1/1986 | U.S.S.R. | 74/573 R |

Primary Examiner—Vinh T. Luong
Attorney, Agent, or Firm—Thomas R. Berthold; Henry E. Otto, Jr.

[57] ABSTRACT

A rotary unit such as a disk file, retained in a dynamically balanced condition. In each end of the unit, there is an annular channel concentric with the rotational axis encircled by a flexible rim. A plurality of balls of substantially identical size and weight are inserted in an outer portion of each channel in which the balls are freely movable. While the unit is rotated at a speed above resonance, a balancing instrument is used to determine the mass magnitude and angle necessary to dynamically balance the unit. Then the balls are circumferentially relocated by vector balancing to provide mass at points equivalent to the determined mass and angle. The relocated balls are then forced axially past an interference ridge and into an inner portion of the respective channel in which the rim is flexed and the balls are held against movement.

2 Claims, 2 Drawing Sheets

DYNAMICALLY BALANCED ROTARY UNIT

BACKGROUND OF THE INVENTION

1. Field of the Invention

This invention relates to methods and means for balancing rotatable units, and relates more particularly to a dynamically balancing and then retained rotatable unit, such as a disk file, in dynamically balanced condition.

2. Description of the Prior Art

The balance correction techniques traditionally used for rotatable units involve adding or removing weights or bending a tab or the like to adjust the center of mass.

The technique currently in widespread use to retain rotatable units, such as magnetic disk files, in dynamically balanced condition is to adhesively secure weights of selectable magnitude at different locations around the hub after the magnitude and angle of the weights needed for balance are calculated by a balancing instrument.

U.S. Pat. No. 4,075,909 discloses a plurality of balls movable within an annular raceway to adjust rotating shaft imbalance upon flexure of a radially movable floating inertia ring. When balance is achieved by repositioning of the balls, the inertia ring rotates concentrically with the shaft to trap each ball in circumferential position. This technique has the following disadvantages: (1) reduced sensitivity due to the need to overcome finger spring loads before the balls are free; (2) need for the balls to overcome friction to roll to a position of lesser imbalance; (3) reliance on precision of the inertia ring for minimum imbalance; (4) limited balance resolution dependent upon the circumferential spacing of slots in the periphery of the ring; (5) complexity of design and assembly; and finally (6) it requires use with a flexible shaft.

Another technique is disclosed in Russian patent 693,136. It uses an electromagnetic to generate wall oscillations so that ball weights can move freely in a damping liquid sealed in an annular cavity to compensate for rotor imbalance; whereupon the balls are locked in their positions by the electromagnet.

U.S. Pat. No. 4,060,009 describes a method of balancing a rotatable hollow shaft by providing within the shaft a sealed housing containing an annular cavity. In the cavity are a plurality of balls and a thermo-setting adhesive. When rotated above resonance, the balls reposition themselves within the cavity to counteract the out-of-balance condition; whereupon a heating coil or the like heats and sets the resin to retain the balls as repositioned. This technique will not dynamically balance with requisite precision because the liquid adhesive creates friction that will resist proper positioning of the balls. Also, implementation of this technique is costly.

There is a need for a dynamically balanced rotary unit with an improved balance connection method which eliminates the need for damping liquids or adhesives; achieves balancing more simply and rapidly and with more precision than means heretofore proposed; and is especially suitable for dynamically balanced disk files which have rigid shafts.

SUMMARY OF THE INVENTION

Toward this end and according to the invention, a a rotatable unit is retained in a dynamically balanced condition. In each end of the unit, there is an annular channel concentric with the rotational axis encircled by a flexible rim. A plurality of balls of substantially identical size and weight are inserted in an outer portion of each channel in which the balls are freely movable. While the unit is rotated at a speed above resonance, a balancing instrument is used to determine the mass magnitude and angle necessary to dynamically balance the unit. Then the balls are circumferentially relocated by vector balancing to provide mass at points equivalent to the determined mass and angle. The relocated balls are then forced axially past an interference ridge and into an inner portion of the respective channel in which the rim is flexed and the balls are held against movement.

DESCRIPTION OF PREFERRED EMBODIMENT

Figure 1:
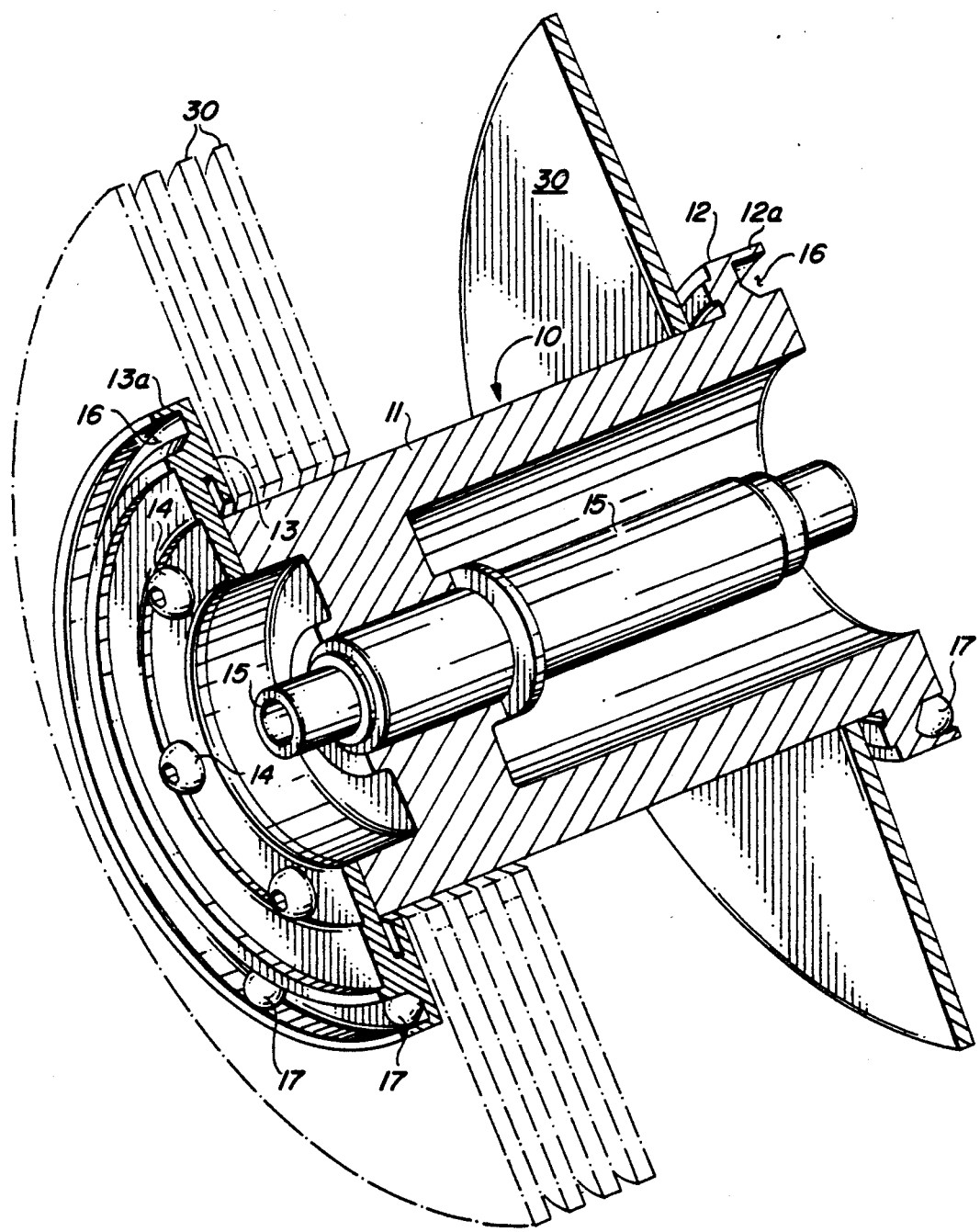
FIG. 1 is a perspective cut-away view of a rotatable disk file unit embodying the invention.

As illustrated in FIG. 1, a rotatable unit 10 embodying the invention illustrated as a disk file comprises a hub 11 having at one end an integral flange 12 and at the other end a clamp ring 13 suitably affixed to the hub at 14. Hub 11 is rotatably mounted on a rigid spindle or shaft 15, supported in bearings and rotated by conventional means (not shown).

According to the invention, in the outer (i.e., nonadjacent) ends of both flange 12 and clamp ring 13 are annular channels 16 concentric with the shaft axis. In each channel 16 are a plurality of balls 17 of substantially identical weight and size. Each channel is in part defined by the flexible outer rim 12a or 13a of flange 12 or ring 13, respectively.

Figure 2:
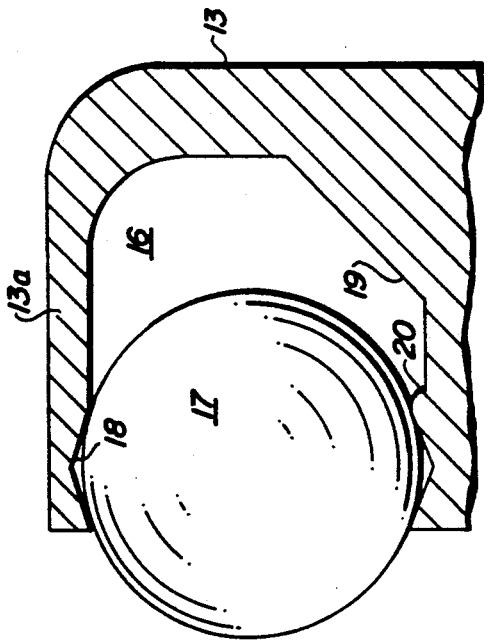
FIG. 2 is a sectional view to enlarged scale of a portion of a clamp ring showing a ball in an outer annular channel.

As best shown in FIG. 2, each channel 16 has an outer portion providing a V-notched track 18 into which the balls 17 are manually insertable by flexing rim 13a (or 12a); whereupon they are freely movable without falling out of the channel.

Figure 3:
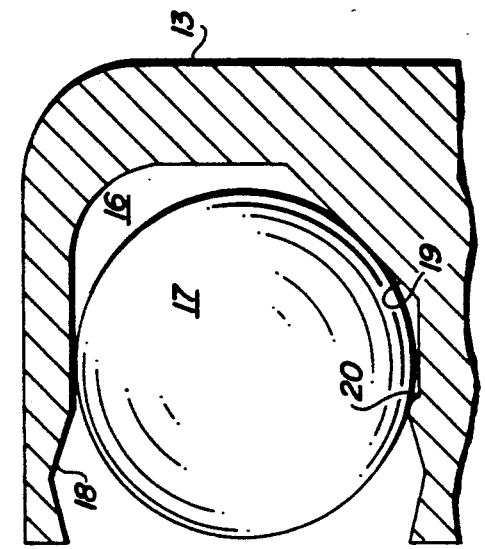
FIG. 3 is a sectional view to the same enlarged scale of the clamp ring flexed to clamp a ball in an inner annular channel.

Each channel 16 also has an inner portion 19 defined in part by an interference ridge 20 adjacent the inner edge of track 18. When balls 17 are forced axially, rim 13a (or 12a) will flex and permit the balls to move from track 18 past interference ridge 20 into inner channel portion 19, as shown in FIG. 3. Once past ridge 20, the balls will be retained against movement by the pressure of rim 13a (or 12a).

Channels 16 and balls 17 are provided in each end of rotatable unit 10, so it can be dynamically balanced, as dynamic balancing requires balancing in two planes.

Figure 4C:
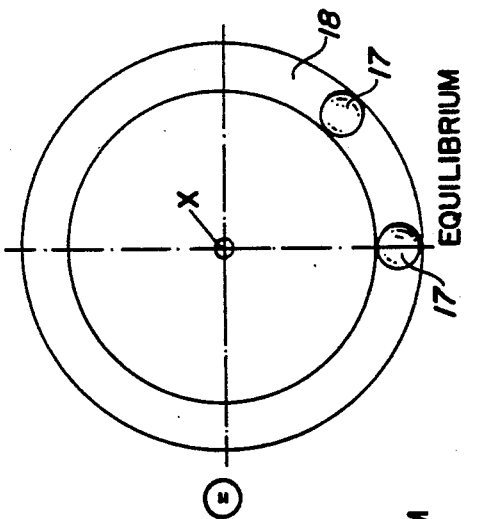
FIGS. 4A, 4B and 4C illustrate the steps in vector balancing of the balls.
Figure 4B:
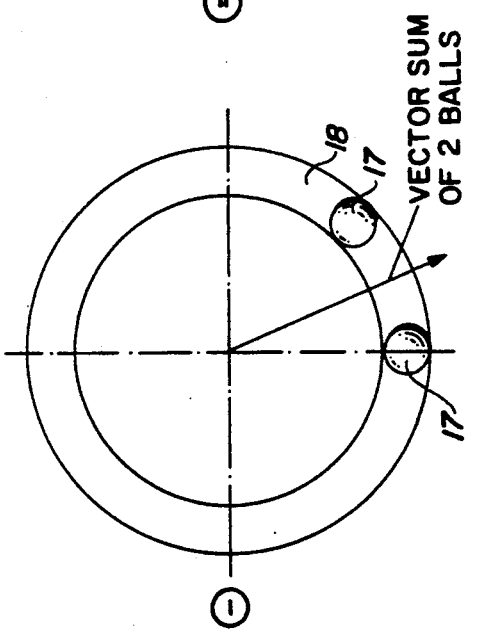
Figure 4A:
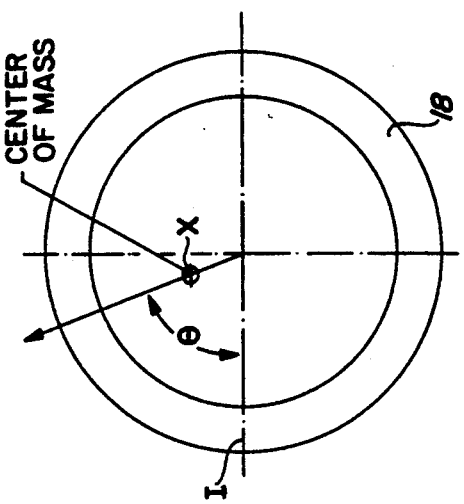

In operation, a conventional microprocessor-based dynamic balancing instrument, such as the CAB 570 Model marketed by Schenck-Treble Corporation of Deer Park, N.Y., is used to measure imbalance of unit 10. The unit is rotated at a speed above resonance while balls 17 are freely movable in their respective tracks 18. The instrument then determines the imbalance magnitude and angle (see X, FIG. 4A) relative to a rotation time reference on index mark I. To compensate for this out-of-balance condition, balls 17 are positioned by vector balancing (see FIGS. 4B, 4C) to provide the compensating mass and ball spacing (i.e., the angular position of the balls) necessary to center mass X at the axis of rotation of the shaft, in the following manner.

While unit 10 is rotating, the balls 17 and hence mass X are repositioned, such as by applying an external force in the direction of movement or relocation to slip the balls circumferentially relative to the rotating unit. This external force may be applied on the balls by a magnetic force or applied by air under pressure directed through a nozzle.

Dynamic balancing is achieved by forcing the balls as now circumferentially relocated from each track 18 over each ridge 20 into the respective inner channel portion 19 of flange 12 and clamp ring 13 (see FIG. 3); whereupon they will be retained, as above explained, against further movement.

This forcing of the balls into the inner channel portion 19 can be achieved by stopping rotation of the unit 10 after the angular position of the balls has been determined for the compensating mass as determined by the balancing instrument. Then the balls are manually forced into desired circumferential positions for the appropriate angle. Alternatively, while the unit 10 is being rotated, the necessary force may be applied by activating an appropriate insertion means (not shown) such as a solenoid-actuated axially movable coaxially rimmed plate that can enter the channel and act on the balls simultaneously.

Rims 12a, 13a are sufficiently flexible that only a low force is required to snap the balls into inner channel portion 19. Balls can be removed from the inner and outer channel portions 19 and 18 by withdrawing the balls axially with a device which captures and holds the balls. Extraction is accomplished by overcoming the resistance of the pressure applied by the respective rim 12a or 13a.

The technique herein described is especially suitable for providing dynamically balanced magnetic disk files. In such case a series of spaced magnetic recording disks (30) would be mounted on hub 11 and clamped between flange 12 and ring 13. However, such an application is to be considered as merely illustrative, as any rotatable unit may be dynamically balanced in accordance with the invention.

While the invention has been shown and described with respect to the preferred embodiment thereof, it will be understood by those skilled in the art that changes in form and detail may be made without departing from the scope and teaching of the invention. Accordingly, the dynamically balanced rotary disk file herein disclosed is to be considered merely as illustrative, and the invention is to be limited only as specified in the claims.

We claim:

1. A dynamically balanced rotary unit comprising:

a rotatable hub;

a pair of annular means, each adjacent a respective one of the axial ends of the hub, and each having an annular channel formed in a respective one of its generally radial side edges and concentric with the axis of rotation of the hub; each annular channel being (i) separated by an annular interference ridge into respective inner and outer portions offset in the direction of said axis, and (ii) encircled by a flexible rim that at least in part defines its outer periphery; and two sets of balls, those of each set being of similar size and weight and freely rotatable in a respective one of the outer portions of an associated one of the channels;

each rim, following dynamic balancing, having been flexed sufficiently to permit each rim to spread and enable the associated set of balls to be moved over the associated interference ridge into the corresponding inner portion of the channel which is constricted and in which the balls of each set are retained by the associated ridge and held against movement by pressure from the then flexed flexible rim for maintaining the rotary unit in dynamically balanced condition.

2. A dynamically balanced disk file comprising a hub comprising at one axial end an integrally formed flange;

a plurality of recording disks mounted as a stack on said hub for rotation thereby;

a clamp ring affixed to the opposite axial end of said hub for clamping the stack of disks therebetween and securing the stack for rotation by the hub;

said flange and ring having, in their respective end faces that are axially remote from each other, respective annular channels, each divided by a corresponding annular interference ridge into inner and outer portions spaced in a direction axially of the hub, said flange and ring each having a respective flexible rim that encircles and in part defines its corresponding annular channel;

a plurality of balls arranged into two sets, those of each set being of similar size and weight and freely rotatable in the outer portion of its corresponding annular channel;

said rim, following dynamic balancing, having been flexed and having permitted each set of balls to be moved axially of the hub from the outer portion of its respective channel over the associated interference ridge to the associated inner portion of the channel which is constricted and in which the balls are held against movement by pressure from the then flexed flexible rim for maintaining the disk file in dynamically balanced condition.

* * * * *